(12) United States Patent
Zha

(10) Patent No.: US 10,652,287 B2
(45) Date of Patent: May 12, 2020

(54) METHOD, DEVICE, AND SYSTEM FOR MANAGING INFORMATION RECOMMENDATION

(71) Applicant: TENCENT TECHNOLOGY (SHENZHEN) COMPANY LIMITED, Shenzhen (CN)

(72) Inventor: Wen Zha, Shenzhen (CN)

(73) Assignee: Tencent Technology (Shenzhen) Company Limited, Shenzhen, Guangdong (CN)

( * ) Notice: Subject to any disclaimer, the term of this patent is extended or adjusted under 35 U.S.C. 154(b) by 147 days.

(21) Appl. No.: 15/650,532

(22) Filed: Jul. 14, 2017

(65) Prior Publication Data

US 2017/0318061 A1    Nov. 2, 2017

Related U.S. Application Data

(63) Continuation of application No. PCT/CN2016/071438, filed on Jan. 20, 2016.

(30) Foreign Application Priority Data

Jan. 20, 2015  (CN) .......................... 2015 1 0027023

(51) Int. Cl.
*H04L 29/06* (2006.01)
*G06F 16/9537* (2019.01)
(Continued)

(52) U.S. Cl.
CPC .......... *H04L 65/1069* (2013.01); *G06F 3/048* (2013.01); *G06F 16/9537* (2019.01);
(Continued)

(58) Field of Classification Search
CPC ............... G06F 17/276; G06F 17/2785; G06F 17/3087; G06F 3/048; G06Q 10/107;
(Continued)

(56) References Cited

U.S. PATENT DOCUMENTS 7,424,682 B1    9/2008 Pupius
8,909,513 B2 *  12/2014 Leydon ................... G06F 40/20
                                                            704/5
(Continued)

FOREIGN PATENT DOCUMENTS

CN    101247359 A    8/2008
CN    102129851 A    7/2011
(Continued)

OTHER PUBLICATIONS

Supplementary European Search Report in European application No. 16739788.4, dated May 9, 2018.
(Continued)

*Primary Examiner* — Jennifer N To
*Assistant Examiner* — Reji Kartholy
(74) *Attorney, Agent, or Firm* — Brinks Gilson & Lione

(57) ABSTRACT

An inquiry for information recommendation sent by a terminal is received; the inquiry for information recommendation may include an account identification of a target communication account; it is determined whether account information corresponding to the account identification of the target communication account includes a pre-set keyword to disable recommendation; if the account information includes the pre-set keyword to disable recommendation, a notification to disable recommendation is sent to the terminal, such that the terminal disables, while communication information is being input in a communication window corresponding to the target communication account, a pop-up of recommended information corresponding to the input communication information in the communication window, improving efficiency in information acquisition.

16 Claims, 10 Drawing Sheets

(51) Int. Cl.

| | | |
|---|---|---|
| *G06F 40/30* | (2020.01) | |
| *G06F 3/048* | (2013.01) | |
| *H04L 12/58* | (2006.01) | |
| *G06F 40/274* | (2020.01) | |
| *H04B 17/345* | (2015.01) | |
| *H04W 76/10* | (2018.01) | |
| *G06Q 10/10* | (2012.01) | |
| *H04W 12/06* | (2009.01) | |
| *H04W 48/08* | (2009.01) | |
| *H04B 17/23* | (2015.01) | |
| *H04W 84/12* | (2009.01) | |
| *H04W 88/02* | (2009.01) | |
| *H04W 88/08* | (2009.01) | |

(52) U.S. Cl.
CPC ............ *G06F 40/274* (2020.01); *G06F 40/30* (2020.01); *G06Q 10/107* (2013.01); *H04B 17/345* (2015.01); *H04L 51/00* (2013.01); *H04L 51/04* (2013.01); *H04L 63/083* (2013.01); *H04W 12/06* (2013.01); *H04W 48/08* (2013.01); *H04W 76/10* (2018.02); *H04B 17/23* (2015.01); *H04W 84/12* (2013.01); *H04W 88/02* (2013.01); *H04W 88/08* (2013.01)

(58) Field of Classification Search
CPC ....... H04B 17/23; H04B 17/345; H04L 51/00; H04L 51/04; H04L 63/083; H04L 65/1069; H04W 12/06; H04W 48/08; H04W 76/10; H04W 84/12; H04W 88/02; H04W 88/08
See application file for complete search history.

(56) References Cited

U.S. PATENT DOCUMENTS

| | | | |
|---|---|---|---|
| 9,244,905 B2* | 1/2016 | Joshi | G06F 40/274 |
| 2005/0267761 A1 | 12/2005 | Ueno | |
| 2008/0070604 A1* | 3/2008 | Castagnet | G06F 3/0237 |
| | | | 455/466 |
| 2010/0169769 A1* | 7/2010 | Jimenez | G06Q 10/107 |
| | | | 715/259 |
| 2011/0191717 A1* | 8/2011 | Cort | G06F 3/048 |
| | | | 715/816 |
| 2013/0159919 A1 | 6/2013 | Leydon | |
| 2013/0197897 A1 | 8/2013 | Okuda | |
| 2013/0253906 A1* | 9/2013 | Archer | G06F 40/274 |
| | | | 704/9 |
| 2014/0028571 A1* | 1/2014 | St. Clair | G06F 3/0412 |
| | | | 345/173 |
| 2014/0047373 A1 | 2/2014 | Kim | |
| 2014/0214409 A1 | 7/2014 | Leydon | |
| 2014/0324414 A1 | 10/2014 | Zhang et al. | |
| 2014/0351720 A1 | 11/2014 | Yin | |
| 2015/0046529 A1* | 2/2015 | Bank | H04L 65/4053 |
| | | | 709/204 |
| 2015/0095020 A1 | 4/2015 | Leydon | |
| 2015/0347384 A1 | 12/2015 | Leydon | |
| 2016/0110058 A1 | 4/2016 | Leydon | |

FOREIGN PATENT DOCUMENTS

| | | |
|---|---|---|
| CN | 103729415 A | 4/2014 |
| CN | 104063369 A | 9/2014 |
| CN | 104125139 A | 10/2014 |
| CN | 104184760 A | 12/2014 |
| CN | 104239535 A | 12/2014 |
| CN | 104618223 A | 5/2015 |
| JP | 2005346252 A | 12/2005 |
| JP | 2015507791 A | 3/2015 |
| KR | 20140105841 A | 9/2014 |
| WO | 2012046546 A1 | 4/2012 |
| WO | 2013176163 A1 | 11/2013 |
| WO | 2014176803 A1 | 11/2014 |

OTHER PUBLICATIONS

English Translation of the Notification of the First Office Action of Korean application No. 10-2017-7022960, dated Jun. 20, 2018.
Notification of the First Office Action of Japanese application No. 2017-538395, dated Sep. 3, 2018.
English Translation of the Notification of the First Office Action of Japanese application No. 2017-538395, dated Sep. 3, 2018.
International Search Report in international application No. PCT/CN2016/071438, dated Apr. 25, 2016.
English Translation of the Written Opinion of the International Search Authority in international application No. PCT/CN2016/071438, dated Apr. 25, 2016.
Notification of the First Office Action of Chinese application No. 201510027023.6, dated May 27, 2017.
English Translation of the Notification of the First Office Action of Chinese application No. 201510027023.6, dated May 27, 2017.

* cited by examiner

METHOD, DEVICE, AND SYSTEM FOR MANAGING INFORMATION RECOMMENDATION

CROSS-REFERENCE TO RELATED APPLICATIONS

This is a continuation application of International Patent Application No. PCT/CN2016/071438, filed on Jan. 20, 2016, which claims priority to Chinese Patent Application No. 201510027023.6 filed on Jan. 20, 2015, both disclosures being incorporated herein by reference in their entirety.

BACKGROUND

Development of Internet technology brings about increasingly wide application of Internet, with increasingly powerful functions. One may install an instant messaging application (such as WeChat and MOMO) on a terminal and communicate with other users, by sending information such as text, a voice, a picture, for example, over the Internet through the instant messaging application.

To allow more vivid communication between users, various types of recommended information, such as an emoticon, a video, or an audio, may be set in an instant messaging application. While a user is inputting communication information in a communication window of a terminal, a pop-up (window) of recommended information corresponding to the input communication information may be displayed automatically in the communication window if the terminal detects that the recommended information is stored locally at the terminal. For example, when the user inputs a word "smile" in a message input box, the terminal may display a pop-up of multiple emoticons corresponding to the word "smile" in the communication window, such that the user may select an emoticon from the pop-up and include the selected emoticon in content of a message that is being edited.

The following technical problems may emerge with the existing art.

Whenever a user inputs a word corresponding to a certain type of recommended information, a pop-up of the recommended information may be automatically displayed in a communication window. However, the user usually may not need to include information such as an emoticon in a dialogue when communicating with a certain user, such as a boss or a teacher, in which case the pop-up may block part of the communication window, leading to a narrowed range readable to the user in the communication window, such that less information may be read, leading to inefficient information acquisition.

SUMMARY

The present disclosure relates to field of Internet technology, and in particular to a method, device, and system for managing information recommendation.

Embodiments herein provide a method, device, and system for managing information recommendation.

According to one embodiment, a method for managing information recommendation includes:

receiving, at a server, an inquiry for information recommendation sent by a terminal, wherein the inquiry for information recommendation includes an account identification of a target communication account;

determining, by the server, whether account information includes a pre-set keyword to disable recommendation, wherein the account information corresponds to the account identification of the target communication account; and if the account information includes the pre-set keyword to disable recommendation, sending, by the server, the terminal a notification to disable, while communication information is being input in a communication window corresponding to the target communication account, pop-up recommendation.

According to another embodiment, a method for managing information recommendation includes:

receiving, at a terminal, an instruction to start a communication window corresponding to a target communication account;

sending, by the terminal, a server an inquiry for information recommendation including an account identification of the target communication account, such that the server returns a notification to disable recommendation if account information includes a pre-set keyword to disable recommendation, wherein the account information corresponds to the account identification of the target communication account; and in response to receiving the notification to disable recommendation returned by the server, disabling, by the terminal while communication information is being input in the communication window, a pop-up of recommended information corresponding to the input communication information in the communication window.

According to yet another embodiment, a server includes:

a receiving module configured for: receiving an inquiry for information recommendation sent by a terminal, wherein the inquiry for information recommendation includes an account identification of a target communication account;

a determining module configured for: determining whether account information includes a pre-set keyword to disable recommendation, wherein the account information corresponds to the account identification of the target communication account; and a sending module configured for: if the account information includes the pre-set keyword to disable recommendation, sending the terminal a notification to disable, while communication information is being input in a communication window corresponding to the target communication account, pop-up recommendation.

According to yet another embodiment, a terminal includes:

a receiving module configured for: receiving an instruction to start a communication window corresponding to a target communication account;

a sending module configured for: sending a server an inquiry for information recommendation including an account identification of the target communication account, such that the server returns a notification to disable recommendation if account information includes a pre-set keyword to disable recommendation, wherein the account information corresponds to the account identification of the target communication account; and a disabling module configured for: in response to receiving the notification to disable recommendation returned by the server, disabling, while communication information is being input in the communication window, a pop-up of recommended information corresponding to the input communication information in the communication window.

According to yet another embodiment, a system for managing information recommendation includes a server and a terminal.

The server is configured for: receiving an inquiry for information recommendation sent by the terminal, wherein the inquiry for information recommendation includes an account identification of a target communication account; determining whether account information includes a pre-set keyword to disable recommendation, wherein the account information corresponds to the account identification of the target communication account; and if the account information includes the pre-set keyword to disable recommendation, sending the terminal a notification to disable recommendation.

The terminal is configured for: receiving an instruction to start the communication window corresponding to the target communication account; sending the server the inquiry for information recommendation including the account identification of the target communication account, such that the server returns the notification to disable recommendation if the account information includes the pre-set keyword to disable recommendation; in response to receiving the notification to disable recommendation returned by the server, disabling, while communication information is being input in the communication window, the pop-up of recommended information corresponding to the input communication information in the communication window.

Beneficial effects of a technical solution according to one of the embodiments herein may be as follows.

An inquiry for information recommendation sent by a terminal is received; the inquiry for information recommendation may include an account identification of a target communication account; it is determined whether account information corresponding to the account identification of the target communication account includes a pre-set keyword to disable recommendation; if the account information includes the pre-set keyword to disable recommendation, a notification to disable recommendation is sent to the terminal, such that the terminal disables, while communication information is being input in a communication window corresponding to the target communication account, a pop-up of recommended information corresponding to the input communication information in the communication window. Thus, when the account information corresponding to the target communication account includes the pre-set keyword to disable recommendation, the terminal may disable, during communication between a user and the target communication account, the pop-up of the recommended information, such that no information in the communication window will be blocked, thereby improving efficiency in information acquisition.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate embodiments consistent with the invention and, together with the description, serve to explain the principles of the invention.

Drawings herein are introduced briefly for clearer illustration of a technical solution herein. Note that the drawings described below refer merely to some embodiments of the disclosure. For those skilled in the art, other drawings may be obtained according to the drawings herein without creative effort.

DETAILED DESCRIPTION

To clearly show a technical problem to be solved, a technical solution, and beneficial effects of the present disclosure, the present disclosure is further elaborated below with reference to the drawings and embodiments.

A method for managing information recommendation may be implemented by a server and a terminal.

Figure 1:
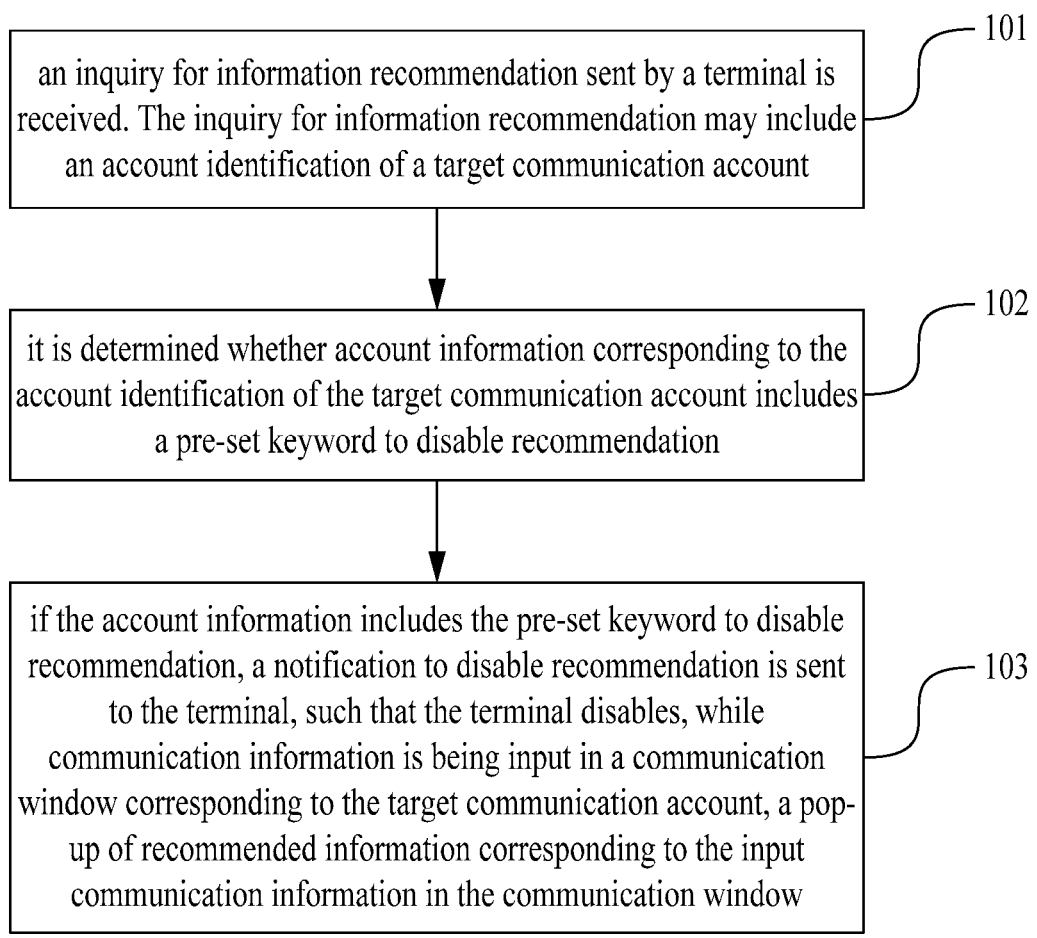
FIG. 1 is a flowchart of a method for managing information recommendation according to an embodiment herein.

As shown in FIG. 1, the method may include a processing flow at the server as follows.

In step 101, an inquiry for information recommendation sent by a terminal is received. The inquiry for information recommendation may include an account identification of a target communication account.

In step 102, it is determined whether account information corresponding to the account identification of the target communication account includes a pre-set keyword to disable recommendation.

In step 103, if the account information includes the pre-set keyword to disable recommendation, a notification to disable recommendation is sent to the terminal, such that the terminal disables, while communication information is being input in a communication window corresponding to the target communication account, a pop-up of recommended information corresponding to the input communication information in the communication window.

Figure 2:
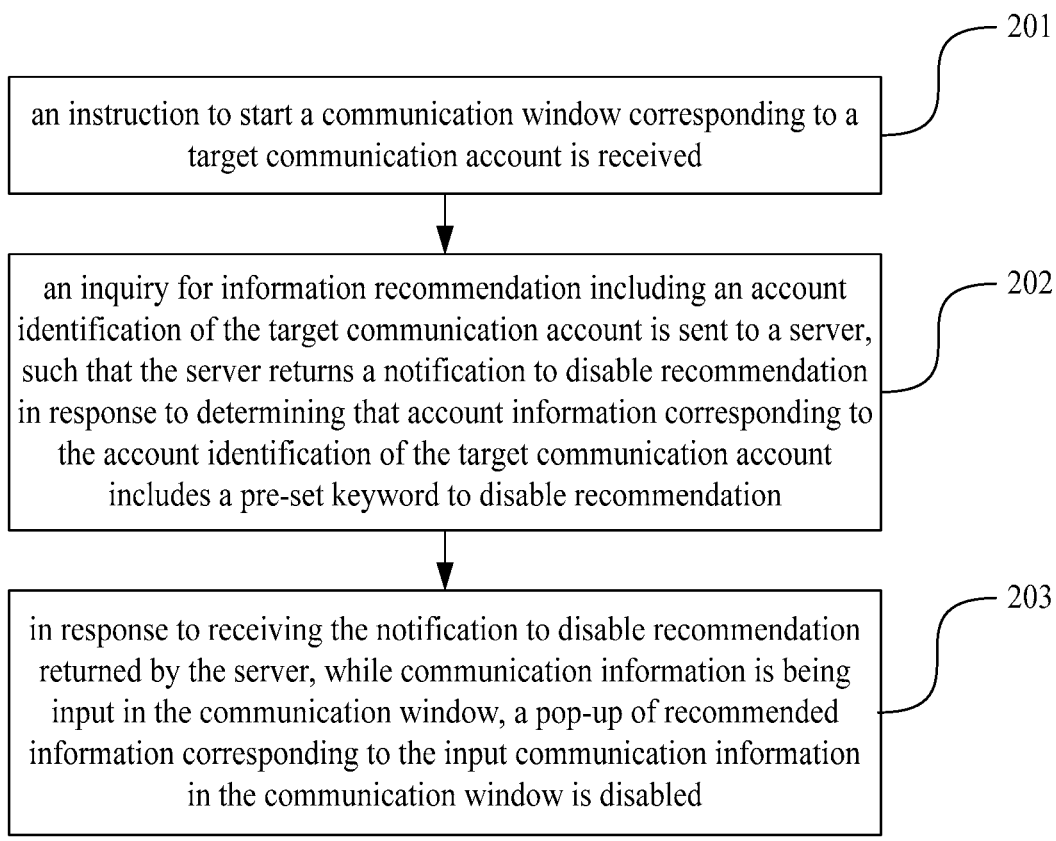
FIG. 2 is a flowchart of a method for managing information recommendation according to an embodiment herein.

As shown in FIG. 2, the method may include a processing flow at the terminal as follows.

In step 201, an instruction to start a communication window corresponding to a target communication account is received.

In step 202, an inquiry for information recommendation including an account identification of the target communication account is sent to a server, such that the server returns a notification to disable recommendation if account information corresponding to the account identification of the target communication account includes a pre-set keyword to disable recommendation.

In step 203, in response to receiving the notification to disable recommendation returned by the server, while communication information is being input in the communication window, a pop-up of recommended information corresponding to the input communication information in the communication window is disabled.

With the embodiment herein, an inquiry for information recommendation sent by a terminal is received; the inquiry for information recommendation may include an account identification of a target communication account; it is determined whether account information corresponding to the account identification of the target communication account includes a pre-set keyword to disable recommendation; if the account information includes the pre-set keyword to disable recommendation, a notification to disable recommendation is sent to the terminal, such that the terminal disables, while communication information is being input in a communication window corresponding to the target communication account, a pop-up of recommended information corresponding to the input communication information in the communication window. Thus, when the account information corresponding to the target communication account includes the pre-set keyword to disable recommendation, the terminal may disable, during communication between a user and the target communication account, the pop-up of the recommended information, such that no information in the communication window will be blocked, thereby improving efficiency in information acquisition.

A method for managing information recommendation may be implemented by a server and a terminal. The terminal may be installed with an instant messaging application, and may be a mobile phone, a tablet computer, or the like, for example. The server may be a background server of a certain instant messaging application.

Figure 3:
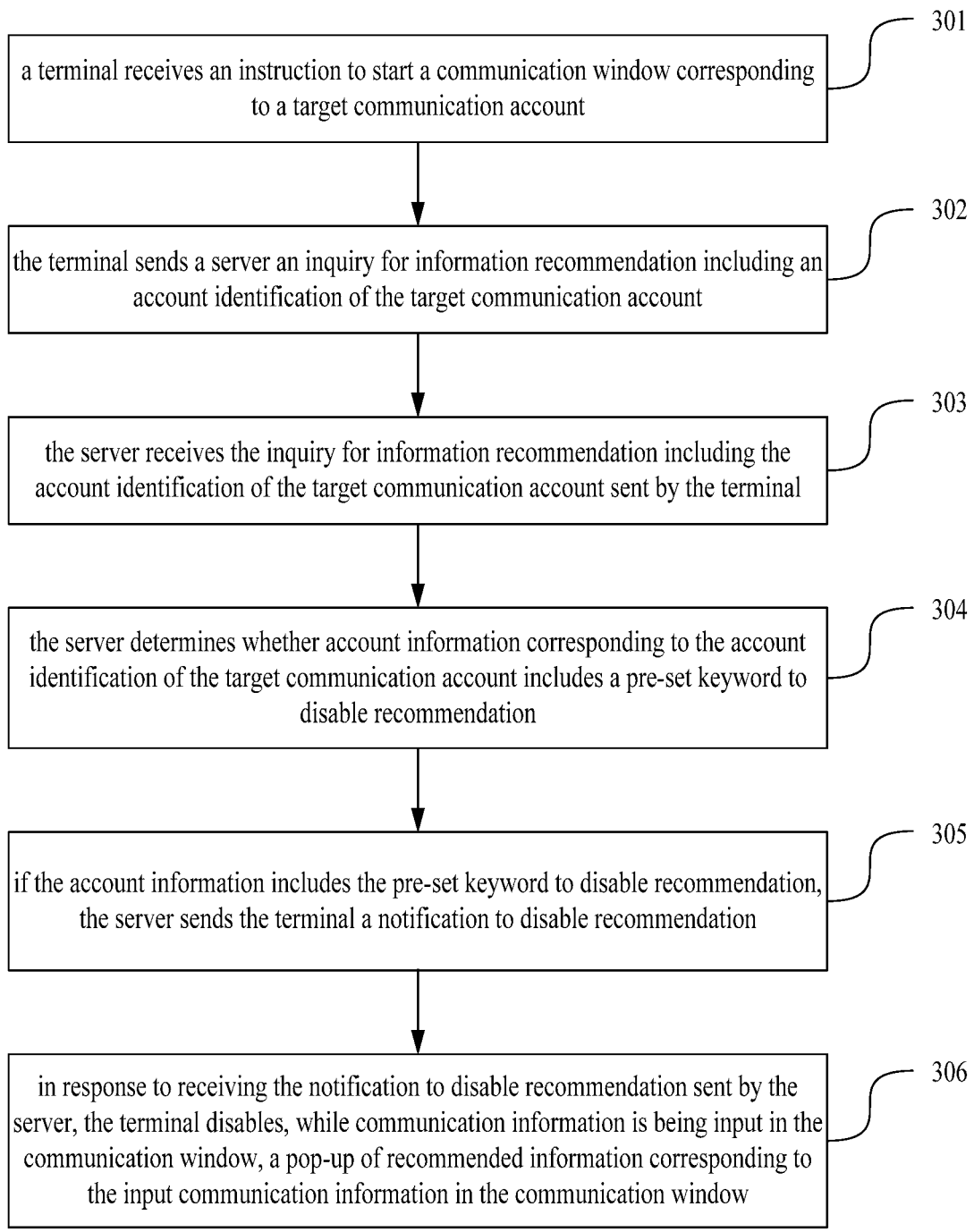
FIG. 3 is a flowchart of a method for managing information recommendation according to an embodiment herein.

A processing flow as shown in FIG. 3 will be elaborated below with reference to a specific implementation, as follows.

In step 301, a terminal receives an instruction to start a communication window corresponding to a target communication account.

A user may install an application with a communication function (such as a certain instant messaging application) in the terminal. To communicate with another user, the user may start the application in the terminal, log on to an account of the user, and click on an icon of a friend account, i.e., the account of a friend, with whom the user is to communicate (namely, the target communication account), in a list of friends. The terminal may receive an instruction to start a communication window corresponding to the target communication account and display the communication window corresponding to the target communication account. The user may input communication information, such as text or a picture, in an input box of the communication window. The information input by the user may be displayed in the communication window. Information sent to the user by the target communication account may also be displayed in the communication window.

Optionally, after receiving the instruction to start the communication window, the terminal may further acquire account information of the target communication account from the list of friends stored locally at the terminal and determine whether the account information includes a pre-set keyword to disable recommendation. If the account information includes the pre-set keyword to disable recommendation, while the communication information is being input in the communication window, a pop-up of recommended information corresponding to the input communication information in the communication window may be disabled. If the account information includes no pre-set keyword to disable recommendation, the flow may continue to execute a subsequent step.

The account information of the target communication account may include an account name of the target communication account, and may further include remarks on the target communication account previously made by the login account of the terminal, etc. The account information of the target communication account may all be stored in the list of friends of the started application. The list of friends may be located in a memory local to the terminal.

The terminal may receive in advance the pre-set keyword to disable recommendation sent by the server. The terminal may store a received keyword locally. The terminal may receive, regularly or from time to time, a keyword to disable recommendation sent by the server and update a locally stored keyword with a received keyword accordingly. The pre-set keyword to disable recommendation may further be pre-set in the terminal by the user and stored locally at the terminal. The pre-set keyword to disable recommendation may include teacher, supervisor, director, director general, work, and/or the like. The user may set the account name of one or more friends as a keyword to disable recommendation.

In step 302, the terminal sends a server an inquiry for information recommendation including an account identification of the target communication account.

After receiving the instruction to start the communication window corresponding to the target communication account, the terminal may acquire the account identification of the target communication account. The terminal may include the account identification of the target communication account in the inquiry for information recommendation. The terminal may then send the inquiry for information recommendation to the server. Whenever receiving an instruction to start the communication window corresponding to the target communication account, the terminal may send the server the inquiry for information recommendation including the account identification of the target communication account. Alternatively, the terminal may send the inquiry for information recommendation to the server the first time receiving the instruction to start the communication window corresponding to the target communication account, and then send the inquiry for information recommendation to the server when detecting that the remarks on the target communication account are modified by the login account of the terminal or when there is a change in the account name of the target communication account.

Optionally, the inquiry for information recommendation may further include an account identification of the login account of the terminal.

In step 303, the server receives the inquiry for information recommendation including the account identification of the target communication account sent by the terminal.

After the terminal sends the server the inquiry for information recommendation including the account identification of the target communication account, the server may receive the inquiry for information recommendation, and may then analyze the inquiry for information recommendation to acquire the account identification of the target communication target therein for subsequent processing.

In step 304, the server determines whether account information corresponding to the account identification of the target communication account includes a pre-set keyword to disable recommendation.

The account information may include information such as the account name of the target communication account and the remarks on the target communication account by the login account of the terminal.

A keyword to disable recommendation, such as teacher, supervisor, director, director general, work, and/or the like, may be pre-set in the server. After acquiring the account identification of the target communication account, the server may acquire the account information corresponding to the account identification of the target communication account and then determine whether the account information matches a keyword to disable recommendation to determine whether the account information includes a pre-set keyword to disable recommendation. For example, the server may determine that the account name of the target communication account is "light and heat" and the remarks on the target communication account by the login account of the terminal are "Director General Li." The server may then determine that the account information of the target communication account includes a keyword to disable recommendation, i.e., "director general."

Optionally, the matching may be performed only on information in the remarks in the account information corresponding to the target communication account to see if there is a hit of a keyword to disable recommendation. Correspondingly, step 304 may be implemented as follows. It may be determined whether the remarks on the target communication account by the login account of the terminal include a pre-set keyword to disable recommendation.

After acquiring the account identification of the target communication account, the server may acquire the remarks on the target communication account by the login account of the terminal and then determine whether the remarks include a pre-set keyword to disable recommendation by determining whether the remarks match the keyword to disable recommendation.

Note that when the user includes the target communication account in his/her list of friends, the terminal may send the server the account identification of the login account of the terminal as well as the account identification and account information of the target communication account. The account information may include the account name of the target communication account. If the user has remarked on the target communication account, the account information may further include the remarks. The server may receive the account identification of the login account of the terminal as well as the account identification and account information of the target communication account. The server may store the received information correspondingly.

Optionally, the server may acquire the remarks on the target communication account made by the login account of the terminal as follows.

The server may acquire, from the account identification of the login account and the account identification and account information of the target communication account stored correspondingly, the account information corresponding to the account identification of the login account of the terminal and the account identification of the target communication account included in the inquiry for information recommendation. The server may extract, from the acquired account information, the remarks on the target communication account made by the login account of the terminal.

Optionally, if there is no remark on the target communication account by the login account of the terminal to disable recommendation, among friend accounts of the target communication account, a first number of friend accounts with remarks on the target communication account including a pre-set keyword to disable recommendation may be determined.

After the account identification of the target communication account is acquired, if no remark to disable recommendation is found according to the account identification of the target communication account, the server may acquire the friend accounts of the target communication account, and then acquire remarks on the target communication account made by the friend accounts of the target communication account. The server may then determine, among the friend accounts of the target communication account, a number of accounts with remarks on the target communication account including a pre-set keyword to disable recommendation (namely, the first number), by determining whether the remarks match a keyword to disable recommendation. Alternatively, if there is no remark on the target communication account by the login account of the terminal to disable recommendation, the server may determine, among friend accounts of the login account of the terminal, the first number as a number of friend accounts with remarks on the target communication account including a pre-set keyword to disable recommendation.

Optionally, remarks on the target communication account made by a friend account of the target communication account may be acquired as follows.

The server may acquire a list of friends of the target communication account, acquire, from the list of friends, an account identification of the friend account of the target communication account, and take the account identification of the friend account as that of a login account. The server may then acquire, from the account identification of the login account and the account identification and account information of the target communication account stored correspondingly, account information corresponding to the target communication account with the friend account as a login account. The server may extract, from the acquired account information, the remarks on the target communication account made by the friend account.

Optionally, if there is no remark on the target communication account by the login account of the terminal to disable recommendation and that the target communication account and the login account of the terminal belong to no same communication group, among the friend accounts of the target communication account, the first number of friend accounts with the remarks on the target communication account including a pre-set keyword to disable recommendation may be determined.

The inquiry for information recommendation sent by the terminal may further include, in addition to the account identification of the target communication account, the account identification of the login account of the terminal. After the account identification of the target communication account is acquired, if no remark to disable recommendation is found according to the account identification of the target communication account, the server may find out whether there is a communication group to which both the login account of the terminal and the target communication account belong. If the target communication account and the login account of the terminal belong to no same communication group, the server may determine, among the friend accounts of the target communication account, the first number of friend accounts with the remarks on the target communication account including a pre-set keyword to disable recommendation.

Optionally, if there is no remark on the target communication account by the login account of the terminal to disable recommendation and that both the target communication account and the login account of the terminal belong to a communication group, among accounts belonging to the communication group, a second number of accounts with remarks on the target communication account including a pre-set keyword to disable recommendation may be determined.

After the account identification of the target communication account is acquired, if no remark to disable recommendation is found according to the account identification of the target communication account, the server may find out whether there is a communication group to which both the login account of the terminal and the target communication account belong. If the target communication account and the login account of the terminal belong to one communication group, the server may acquire all accounts belonging to the communication group, and acquire remarks on the target communication account made by such accounts. The server may then determine, among all accounts belonging to the communication group, the second number as a number of accounts with remarks on the target communication account including a pre-set keyword to disable recommendation, by determining whether the remarks match the keyword to disable recommendation.

The remarks on the target communication account made by any account belong to the communication group may be acquired in a similar way as how the remarks on the target communication account made by a friend account of the target communication account are acquired, as described, which will not be repeated.

Optionally, the account information of the target communication account as stored in the server may be identical to that stored locally at the terminal. The terminal may determine that the locally stored account information includes no pre-set keyword to disable recommendation. In this case, after receiving the inquiry for information recommendation, the server may skip determining whether the account information of the target communication account includes a keyword to disable recommendation, and go on to execute a step such as determining the first number or the second number, etc.

In step 305, if the account information includes the pre-set keyword to disable recommendation, the server sends the terminal a notification to disable recommendation.

If the account information matches a pre-set keyword to disable recommendation, the server may send the terminal the notification to disable recommendation. If the account information includes no pre-set keyword to disable recommendation, the server may send the terminal a notification to perform default recommendation.

Optionally, matching may be performed on the remarks in the account information corresponding to the target communication account. Correspondingly, step 305 may be implemented as follows. If the remarks on the target communication account by the login account of the terminal include a pre-set keyword to disable recommendation, the server may send the terminal the notification to disable recommendation.

The server may acquire the remarks on the target communication account made by the login account of the terminal and determine whether the remarks match with a keyword to disable recommendation. If the remarks include a pre-set keyword to disable recommendation, the server may send the terminal the notification to disable recommendation. If the remarks include no pre-set keyword to disable recommendation, the server may send the terminal the notification to perform default recommendation.

Optionally, if the login account of the terminal has made no remark on the target communication account to disable recommendation, step 305 may be implemented as follows. If the first number is greater than a pre-set threshold, the server may send the terminal the notification to disable recommendation.

After determining the first number, the server may compare the first number with the pre-set threshold, and may send the terminal the notification to disable recommendation if the first number is greater than the pre-set threshold. The server may send the terminal the notification to perform default recommendation if the first number is no greater than the pre-set threshold. For example, if the pre-set threshold is 3 and the first number has been determined to be 6, the server may send the terminal the notification to disable recommendation. In addition, the server may pre-set the threshold in percentage. The server may compute a percentage of friend accounts of the target communication account with remarks on the target communication account including a pre-set keyword to disable recommendation. For example, the pre-set threshold in percentage may be 40%, the target communication account may have a total number of 50 friend accounts, and the server may have determined a first number equal to 25. The server may then determine that the first number is 50% of the total number of the friend accounts of the target communication account, which percentage is greater than the pre-set threshold in percentage, 40%. The server may then send the terminal the notification to disable recommendation.

Optionally, if there is no remark on the target communication account made by the login account of the terminal to disable recommendation and that both the target communication account and the login account of the terminal belong to one communication group, step 305 may be implemented as follows. If the second number is greater than the pre-set threshold, the server may send the terminal the notification to disable recommendation.

After determining the second number, the server may compare the second number with the pre-set threshold, and may send the terminal the notification to disable recommendation if the second number is greater than the pre-set threshold. The server may send the terminal the notification to perform default recommendation if the second number is no greater than the pre-set threshold. For example, if the pre-set threshold is 3 and the second number has been determined to be 5, the server may send the terminal the notification to disable recommendation. In addition, the server may pre-set the threshold in percentage. The server may compute a percentage of accounts belonging to the communication group with remarks on the target communication account including a pre-set keyword to disable recommendation. For example, the pre-set threshold in percentage may be 40%, the communication group may include a total number of 20 accounts, and the server may have determined a second number equal to 9. The server may then determine that the second number is 45% of the total number of accounts belonging to the communication group, which percentage is greater than the pre-set threshold in percentage, 40%. The server may then send the terminal the notification to disable recommendation.

Optionally, the server may pre-set a keyword to enhance recommendation. If the account information includes no pre-set keyword to enhance recommendation and no pre-set keyword to disable recommendation, the server may send the terminal a notification to perform default recommendation. The terminal may then enable, while the communication information is being input in the communication window corresponding to the target communication account, the pop-up of the recommended information corresponding to the input communication information in the communication window. An amount of the recommended information per display may be limited by a first pre-set amount. If the account information includes a pre-set keyword to enhance recommendation, the server may send the terminal a notification to enhance recommendation. The terminal may then enable, while the communication information is being input in the communication window corresponding to the target communication account, the pop-up of the recommended information corresponding to the input communication information in the communication window. The amount of the recommended information per display may be limited by a second pre-set amount.

The server may include a pre-set keyword to enhance recommendation, such as boyfriend, girlfriend, alumni, and community. After acquiring the account identification of the target communication account, the server may acquire the account information corresponding to the account identification of the target communication account. The server may then determine whether the account information includes a pre-set keyword to enhance recommendation or a pre-set keyword to disable recommendation by determining whether the account information matches the pre-set keyword to enhance recommendation or the pre-set keyword to disable recommendation. For example, the server may determine that the account name of the target communication account is "Lili" and the remarks on the target communication account made by the login account of the terminal are "stranger." The server may then determine that the account information includes no pre-set keyword to enhance recommendation and no pre-set keyword to disable recommendation, and may send the terminal the notification to perform default recommendation.

The server may determine that the account name of the target communication account is "cup" and the remarks on the target communication account by the login account of the terminal are "girlfriend." The server may then determine that the account information includes a pre-set keyword to enhance recommendation, i.e., "girlfriend," and may send the terminal the notification to start/enable/enhance recommendation.

In step 306, in response to receiving the notification to disable recommendation sent by the server, the terminal disables, while communication information is being input in the communication window, a pop-up of recommended information corresponding to the input communication information in the communication window.

Figure 4:
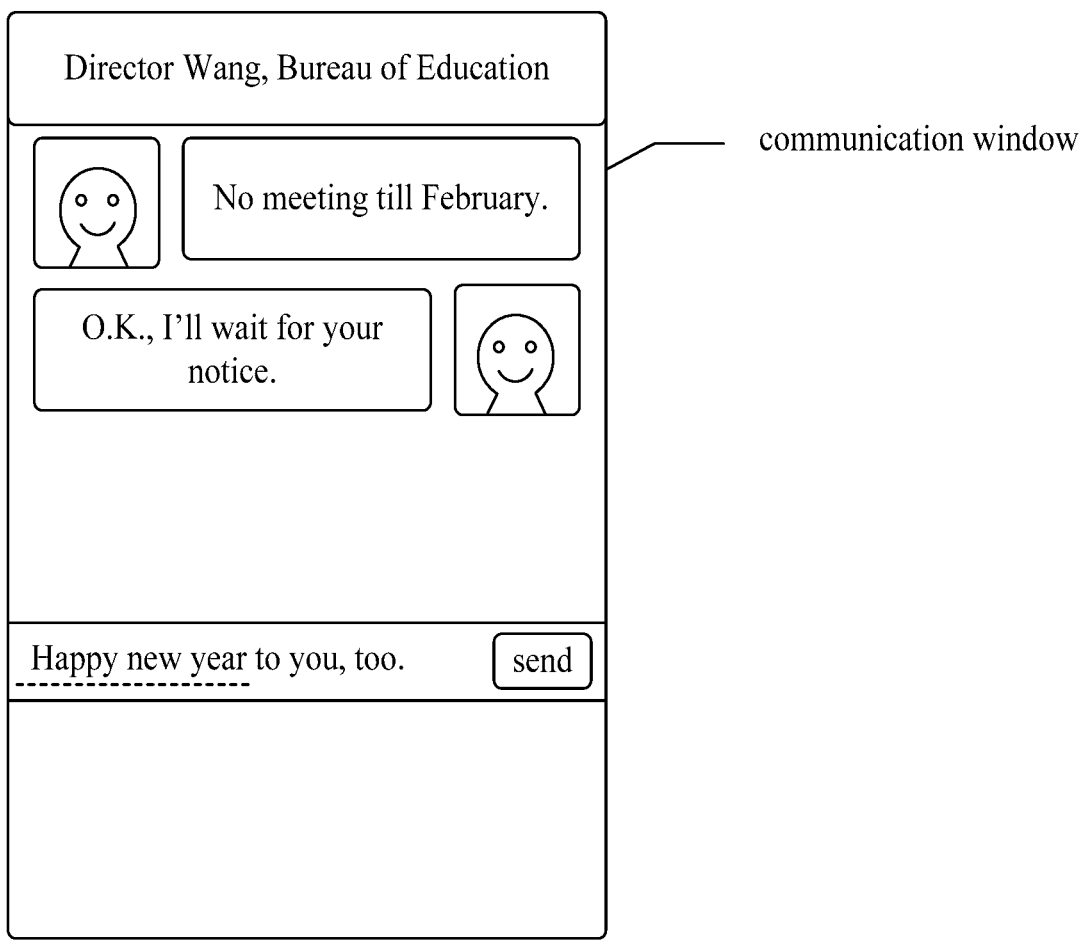
FIG. 4 is a diagram of a display interface according to an embodiment herein.

After sending the inquiry for information recommendation, the terminal may receive the notification to disable recommendation sent by the server. The terminal may disable, while the user is inputting communication information in the communication window corresponding to the target communication account, the pop-up of the recommended information corresponding to the input communication information in the communication window. As shown in FIG. 4, in response to receiving the notification to perform default recommendation sent by the server, the terminal may enable the pop-up of the recommended information corresponding to the input communication information in the communication window according to a default mechanism of information recommendation.

Optionally, in case that a keyword to enhance recommendation is pre-set in the server, in response to receiving the notification to perform default recommendation sent by the server, the terminal may enable, while the communication information is being input in the communication window, the pop-up of the recommended information corresponding to the input communication information in the communication window. An amount of the recommended information per display may be limited by a first pre-set amount. In response to receiving a notification to enhance recommendation sent by the server, the terminal may enable, while the communication information is being input in the communication window, the pop-up of the recommended information corresponding to the input communication information in the communication window. The amount of the recommended information per display may be limited by a second pre-set amount. The second pre-set amount may be greater than the first pre-set amount.

Figure 5:
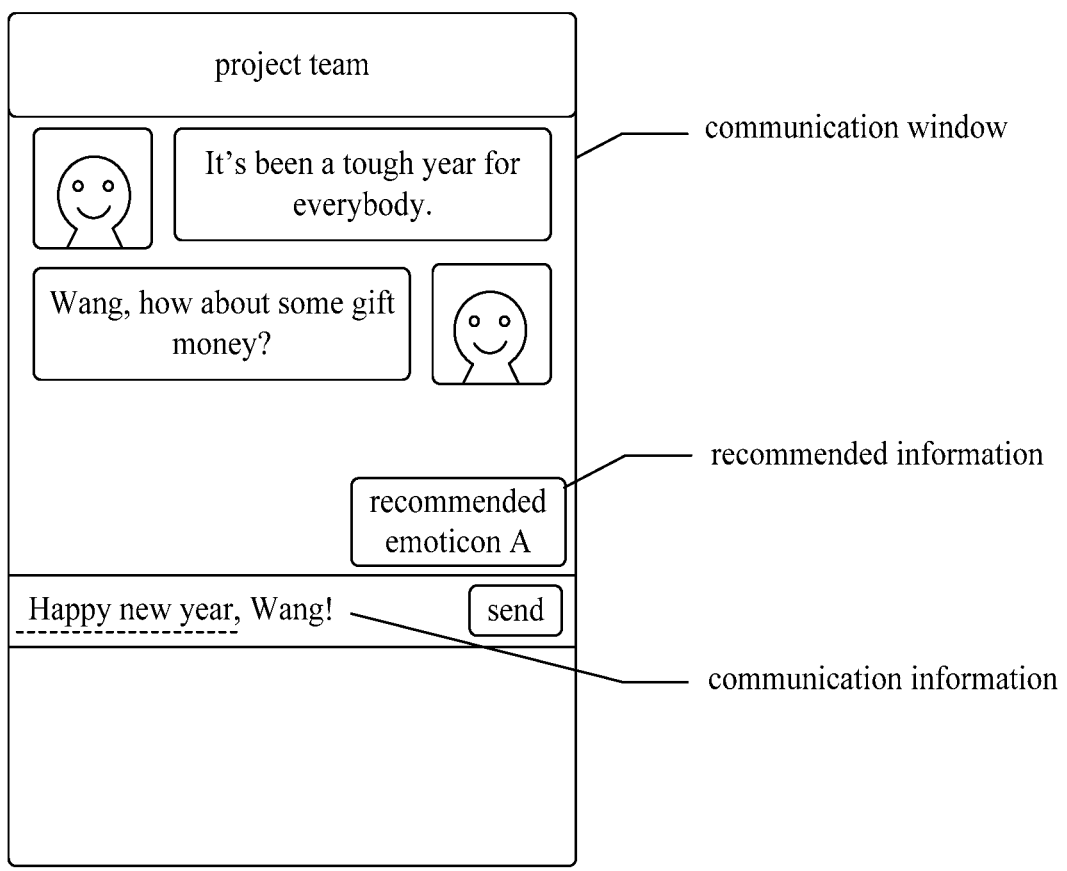
FIG. 5 is a diagram of a display interface according to an embodiment herein.

After sending the inquiry for information recommendation, the terminal may receive the notification to perform default recommendation sent by the server. The terminal may search, while the user is inputting communication information, for the recommended information corresponding to the input communication information and enable the pop-up of the recommended information corresponding to the input communication information in the communication window. The amount of the recommended information per display may have to be no greater than a system default upper limit, namely, the first pre-set amount, such as 1 emoticon, as shown in FIG. 5.

Figure 6:
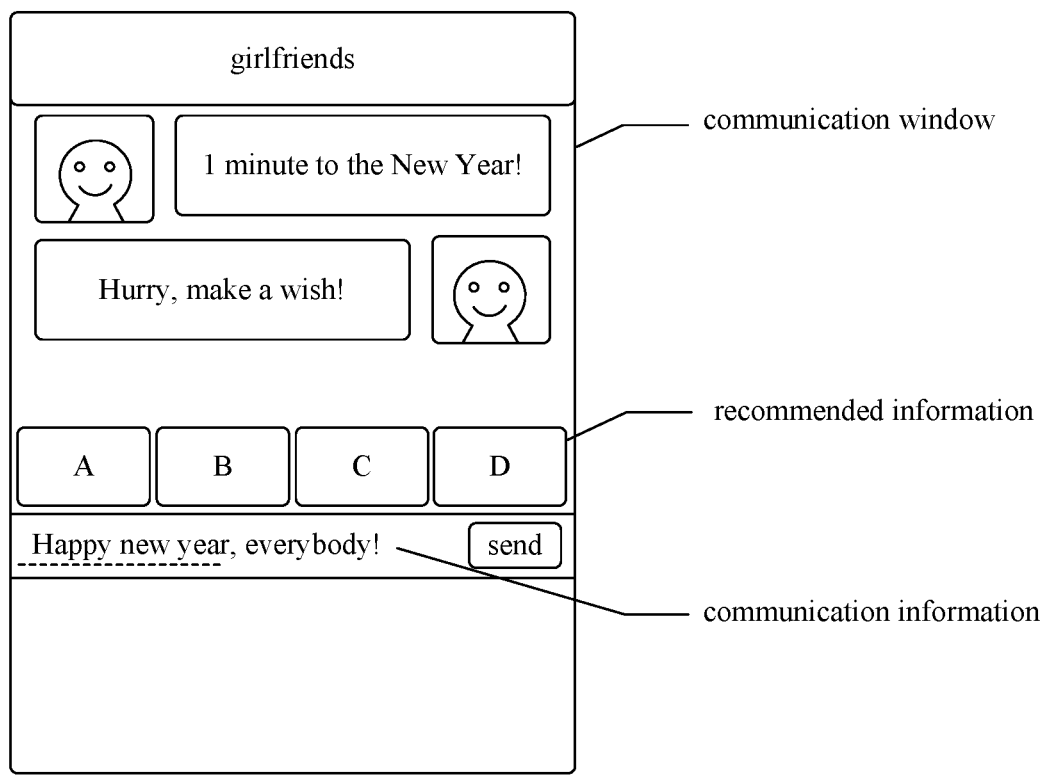
FIG. 6 is a diagram of a display interface according to an embodiment herein.

In response to receiving the notification to enhance recommendation sent by the server, the terminal may search for the recommended information corresponding to the input communication information and then enable the pop-up of the recommended information in the communication window. The amount of the recommended information per display may have to be no greater than an enhanced amount, namely, the second pre-set amount, such as 4, as shown in FIG. 6.

The terminal may periodically update locally stored recommended information and prioritize the pop-up of the most updated recommended information. The terminal may also prioritize the pop-up of recommended information most frequently selected by the user according to a record of selecting recommended information by the user. The terminal may also randomly select, from the recommended information, a pre-set amount of recommended information, and display the selected recommended information.

With the embodiment herein, an inquiry for information recommendation sent by a terminal is received; the inquiry for information recommendation may include an account identification of a target communication account; it is determined whether account information corresponding to the account identification of the target communication account includes a pre-set keyword to disable recommendation; if the account information includes the pre-set keyword to disable recommendation, a notification to disable recommendation is sent to the terminal, such that the terminal disables, while communication information is being input in a communication window corresponding to the target communication account, a pop-up of recommended information corresponding to the input communication information in the communication window. Thus, when the account information corresponding to the target communication account includes the pre-set keyword to disable recommendation, the terminal may disable, during communication between a user and the target communication account, the pop-up of the recommended information, such that no information in the communication window will be blocked, thereby improving efficiency in information acquisition.

Figure 7:
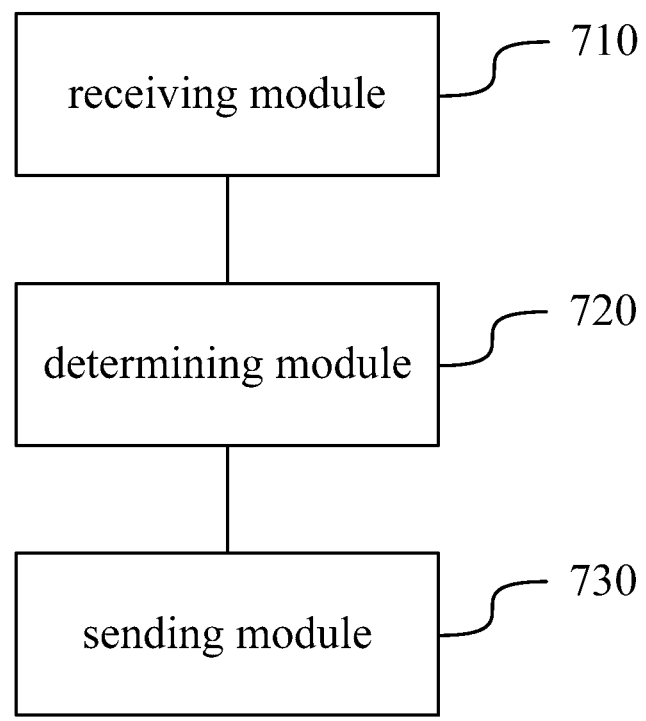
FIG. 7 is a diagram of a structure of a server according to an embodiment herein.

Based on the same technical concept, a server is provided in another embodiment herein. As shown in FIG. 7, the server includes a receiving module 710, a determining module 720, and a sending module 730.

The receiving module 710 is configured for: receiving an inquiry for information recommendation sent by a terminal. The inquiry for information recommendation may include an account identification of a target communication account.

The determining module 720 is configured for: determining whether account information corresponding to the account identification of the target communication account includes a pre-set keyword to disable recommendation.

The sending module 730 is configured for: if the account information includes the pre-set keyword to disable recommendation, sending the terminal a notification to disable recommendation, such that the terminal disables, while communication information is being input in a communication window corresponding to the target communication account, a pop-up of recommended information corresponding to the input communication information in the communication window.

The sending module 730 may be further configured for: if the account information includes no pre-set keyword to enhance recommendation and no pre-set keyword to disable recommendation, sending the terminal a notification to perform default recommendation, such that the terminal enables, while the communication information is being input in the communication window corresponding to the target communication account, the pop-up of the recommended information corresponding to the input communication information in the communication window. An amount of the recommended information per display may be limited by a first pre-set amount.

The sending module 730 may be further configured for: if the account information includes a pre-set keyword to enhance recommendation, sending the terminal a notification to enhance recommendation, such that the terminal enables, while the communication information is being input in the communication window corresponding to the target communication account, the pop-up of the recommended information corresponding to the input communication information in the communication window. The amount of the recommended information per display may be limited by a second pre-set amount.

The determining module 720 may be configured for: determining whether remarks on the target communication account by a login account of the terminal include the pre-set keyword to disable recommendation.

The sending module 730 may be configured for: if the remarks on the target communication account by the login account of the terminal includes the pre-set keyword to disable recommendation, sending the terminal the notification to disable recommendation.

The determining module 720 may be further configured for: if there is no remark on the target communication account by the login account of the terminal to disable recommendation, determining, among friend accounts of the target communication account, a first number of friend accounts with remarks on the target communication account including the pre-set keyword to disable recommendation.

The sending module 730 may be configured for: if the first number is greater than a pre-set threshold, sending the terminal the notification to disable recommendation.

The determining module 720 may be configured for: if there is no remark on the target communication account by the login account of the terminal to disable recommendation and that the target communication account and the login account of the terminal belong to no same communication group, determining, among the friend accounts of the target communication account, the first number of friend accounts with the remarks on the target communication account including the pre-set keyword to disable recommendation.

The determining module 720 may be further configured for: if there is no remark on the target communication account by the login account of the terminal to disable recommendation and that both the target communication account and the login account of the terminal belong to a communication group, determining, among accounts belonging to the communication group, a second number of accounts with remarks on the target communication account including the pre-set keyword to disable recommendation.

The sending module 730 may be configured for: if the second number is greater than the pre-set threshold, sending the terminal the notification to disable recommendation.

Figure 8:
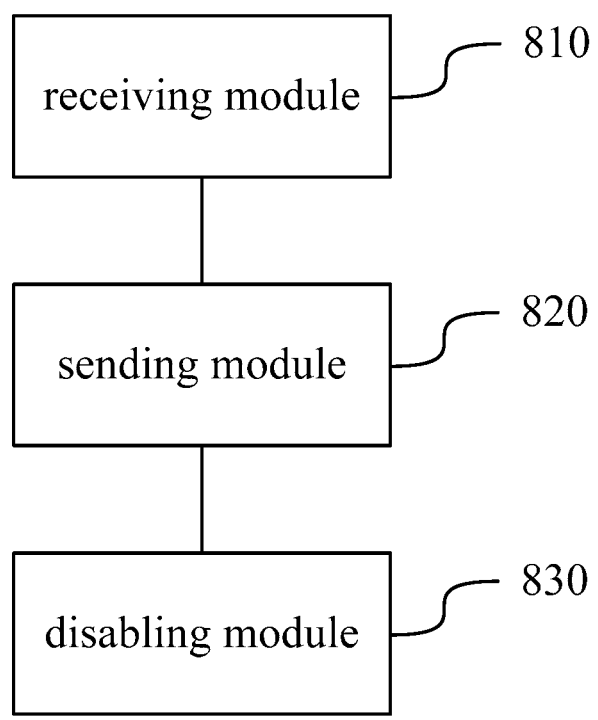
FIG. 8 is a diagram of a structure of a terminal according to an embodiment herein.

Based on the same technical concept, an embodiment herein further provides a terminal. As shown in FIG. 8, the terminal includes a receiving module 810, a sending module 820, and a disabling module 830.

The receiving module 810 is configured for: receiving an instruction to start a communication window corresponding to a target communication account.

The sending module 820 is configured for: sending a server an inquiry for information recommendation including an account identification of the target communication account, such that the server returns a notification to disable recommendation if account information corresponding to the account identification of the target communication account includes a pre-set keyword to disable recommendation.

The disabling module 830 is configured for: in response to receiving the notification to disable recommendation returned by the server, disabling, while communication information is being input in the communication window, a pop-up of recommended information corresponding to the input communication information in the communication window.

The terminal may further include a pop-up module.

The pop-up module may be configured for: in response to receiving a notification to perform default recommendation sent by the server, enabling, while the communication information is being input in the communication window, the pop-up of the recommended information corresponding to the input communication information in the communication window. An amount of the recommended information per display may be limited by a first pre-set amount.

The pop-up module may be configured for: in response to receiving a notification to enhance recommendation sent by the server, enabling, while the communication information is being input in the communication window, the pop-up of the recommended information corresponding to the input communication information in the communication window. The amount of the recommended information per display may be limited by a second pre-set amount. The second pre-set amount may be greater than the first pre-set amount.

The terminal may further include a determining module configured for: determining whether the account information of the target communication account stored locally includes the pre-set keyword to disable recommendation; if the account information stored locally includes the pre-set keyword to disable recommendation, notifying the disabling module to disable, while the communication information is being input in the communication window, the pop-up of the recommended information corresponding to the input communication information in the communication window; and if the account information stored locally includes no pre-set keyword to disable recommendation, notifying the sending module to send the server the inquiry for information recommendation including the account identification of the target communication account.

With the embodiment herein, an inquiry for information recommendation sent by a terminal is received; the inquiry for information recommendation may include an account identification of a target communication account; it is determined whether account information corresponding to the account identification of the target communication account includes a pre-set keyword to disable recommendation; if the account information includes the pre-set keyword to disable recommendation, a notification to disable recommendation is sent to the terminal, such that the terminal disables, while communication information is being input in a communication window corresponding to the target communication account, a pop-up of recommended information corresponding to the input communication information in the communication window. Thus, when the account information corresponding to the target communication account includes the pre-set keyword to disable recommendation, the terminal may disable, during communication between a user and the target communication account, the pop-up of the recommended information, such that no information in the communication window will be blocked, thereby improving efficiency in information acquisition.

Based on the same technical concept, provided in yet another embodiment herein is a system for managing information recommendation, which includes a server and a terminal.

The server is configured for: receiving an inquiry for information recommendation sent by the terminal, the inquiry for information recommendation including an account identification of a target communication account; determining whether account information corresponding to the account identification of the target communication account includes a pre-set keyword to disable recommendation; and if the account information includes the pre-set keyword to disable recommendation, sending the terminal a notification to disable recommendation.

The terminal is configured for: receiving an instruction to start a communication window corresponding to the target communication account; sending the server the inquiry for information recommendation including the account identification of the target communication account, such that the server returns the notification to disable recommendation if the account information corresponding to the account identification of the target communication account includes the pre-set keyword to disable recommendation; in response to receiving the notification to disable recommendation returned by the server, disabling, while communication information is being input in the communication window, a pop-up of recommended information corresponding to the input communication information in the communication window.

With the embodiment herein, an inquiry for information recommendation sent by a terminal is received; the inquiry for information recommendation may include an account identification of a target communication account; it is determined whether account information corresponding to the account identification of the target communication account includes a pre-set keyword to disable recommendation; if the account information includes the pre-set keyword to disable recommendation, a notification to disable recommendation is sent to the terminal, such that the terminal disables, while communication information is being input in a communication window corresponding to the target communication account, a pop-up of recommended information corresponding to the input communication information in the communication window. Thus, when the account information corresponding to the target communication account includes the pre-set keyword to disable recommendation, the terminal may disable, during communication between a user and the target communication account, the pop-up of the recommended information, such that no information in the communication window will be blocked, thereby improving efficiency in information acquisition.

Figure 9:
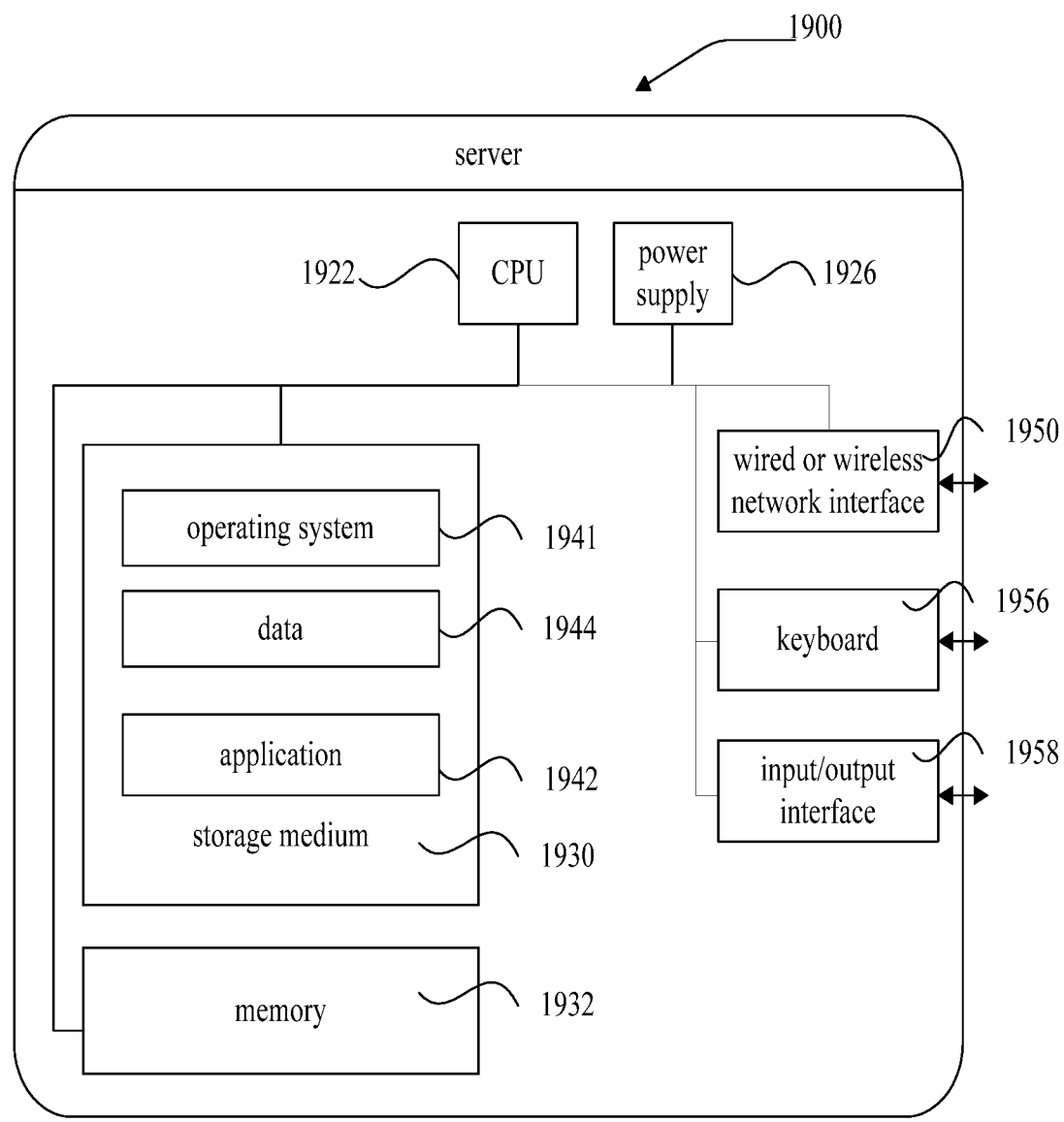
FIG. 9 is a diagram of a structure of a server according to an embodiment herein.

FIG. 9 is a diagram of a structure of a server according to an embodiment herein. The server 1900 may differ a lot depending on configuration or performance, and may include one or more Central Processing Units (CPU) 1922 (such as one or more processors), a memory 1932 and one or more storage media 1930 (such as one or more massive storage devices) for storing an application 1942 or data 1944. The memory 1932 and the storage medium 1930 may be configured for short-term or long-term storage. The program stored in the storage medium 1930 may include one or more modules (not shown). Each such module may include a series of operation instructions directed to the server as described above. Furthermore, the CPU 1922 may be configured for communicating with the storage medium 1930 and executing, on the server 1900, the series of operation instructions in the storage medium 1930.

The server 1900 may further include one or more power supplies 1926, one or more wired or wireless network interfaces 1950, one or more input/output interfaces 1958, one or more keyboards 1956, and/or, one or more operating systems 1941, such as Windows Server™, Mac OS X™, Unix™, Linux™, FreeBSD™, etc.

The server 1900 may include the memory and one or more programs stored in the memory. The one or more programs may be configured to be executed by one or more processors. The one or more programs may include instructions for executing an operation as follows:

receiving an inquiry for information recommendation sent by a terminal, the inquiry for information recommendation including an account identification of a target communication account;

determining whether account information corresponding to the account identification of the target communication account includes a pre-set keyword to disable recommendation; and if the account information includes the pre-set keyword to disable recommendation, sending the terminal a notification to disable recommendation, such that the terminal disables, while communication information is being input in a communication window corresponding to the target communication account, a pop-up of recommended information corresponding to the input communication information in the communication window.

The method may further include an operation as follows:

if the account information includes no pre-set keyword to enhance recommendation and no pre-set keyword to disable recommendation, sending the terminal a notification to perform default recommendation, such that the terminal enables, while the communication information is being input in the communication window corresponding to the target communication account, the pop-up of the recommended information corresponding to the input communication information in the communication window, an amount of the recommended information per display being limited by a first pre-set amount; and if the account information includes a pre-set keyword to enhance recommendation, sending the terminal a notification to enhance recommendation, such that the terminal enables, while the communication information is being input in the communication window corresponding to the target communication account, the pop-up of the recommended information corresponding to the input communication information in the communication window, the amount of the recommended information per display being limited by a second pre-set amount.

The step of determining whether account information corresponding to the account identification of the target communication account includes a pre-set keyword to disable recommendation may include:

determining whether remarks on the target communication account by a login account of the terminal include the pre-set keyword to disable recommendation.

The step of if the account information includes the pre-set keyword to disable recommendation, sending the terminal a notification to disable recommendation may include:

if the remarks on the target communication account by the login account of the terminal includes the pre-set keyword to disable recommendation, sending the terminal the notification to disable recommendation.

The method may further include a step as follows:

if there is no remark on the target communication account by the login account of the terminal to disable recommendation, determining, among friend accounts of the target communication account, a first number of friend accounts with remarks on the target communication account including the pre-set keyword to disable recommendation; and if the first number is greater than a pre-set threshold, sending the terminal the notification to disable recommendation.

The step of if there is no remark on the target communication account by the login account of the terminal to disable recommendation, determining, among friend accounts of the target communication account, a first number of friend accounts with remarks on the target communication account including the pre-set keyword to disable recommendation may include:

if there is no remark on the target communication account by the login account of the terminal to disable recommendation and that the target communication account and the login account of the terminal belong to no same communication group, determining, among the friend accounts of the target communication account, the first number of friend accounts with the remarks on the target communication account including the pre-set keyword to disable recommendation.

The method may further include:

if there is no remark on the target communication account by the login account of the terminal to disable recommendation and that both the target communication account and the login account of the terminal belong to a communication group, determining, among accounts belonging to the communication group, a second number of accounts with remarks on the target communication account including the pre-set keyword to disable recommendation; and if the second number is greater than the pre-set threshold, sending the terminal the notification to disable recommendation.

With the embodiment herein, an inquiry for information recommendation sent by a terminal is received; the inquiry for information recommendation may include an account identification of a target communication account; it is determined whether account information corresponding to the account identification of the target communication account includes a pre-set keyword to disable recommendation; if the account information includes the pre-set keyword to disable recommendation, a notification to disable recommendation is sent to the terminal, such that the terminal disables, while communication information is being input in a communication window corresponding to the target communication account, a pop-up of recommended information corresponding to the input communication information in the communication window. Thus, when the account information corresponding to the target communication account includes the pre-set keyword to disable recommendation, the terminal may disable, during communication between a user and the target communication account, the pop-up of the recommended information, such that no information in the communication window will be blocked, thereby improving efficiency in information acquisition.

Figure 10:
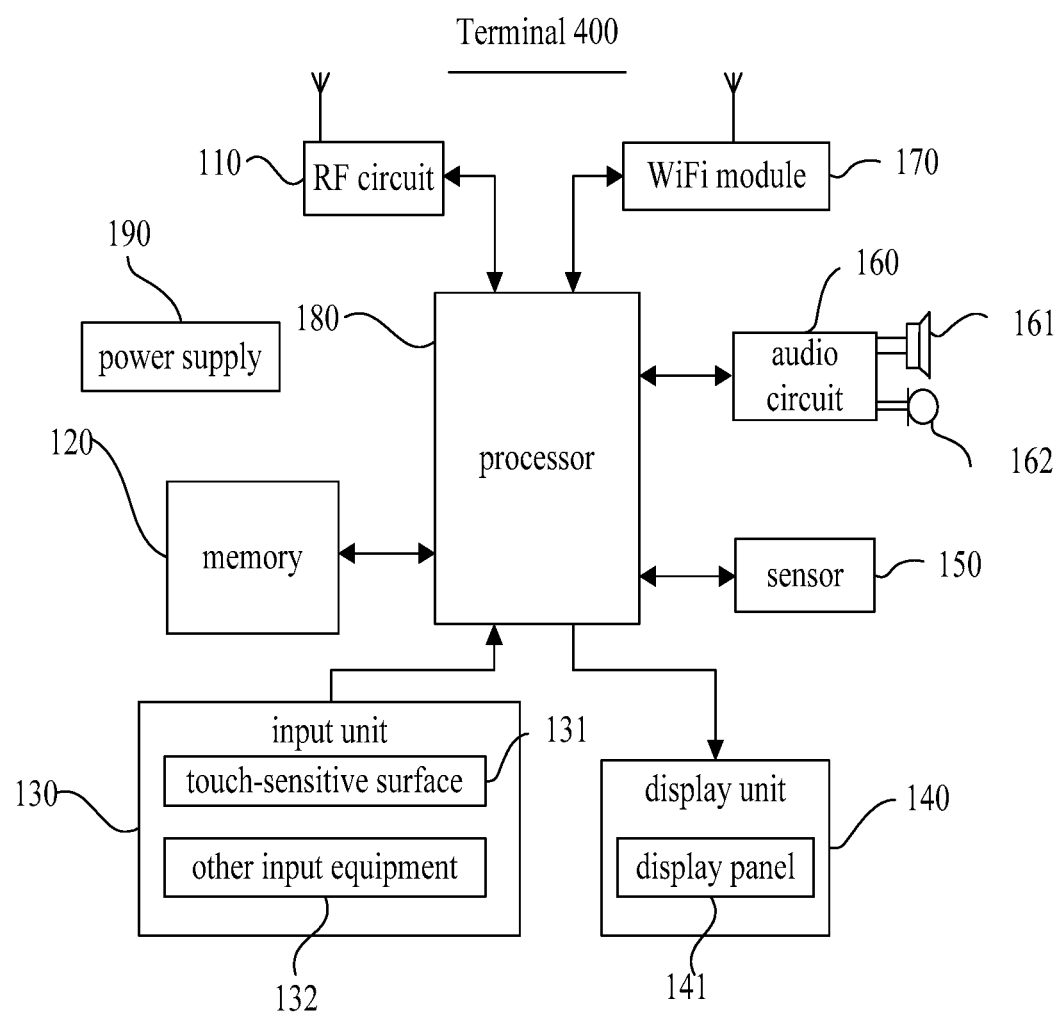
FIG. 10 is a diagram of a structure of a terminal according to an embodiment herein.

FIG. 10 is a diagram of a structure of a terminal according to an embodiment herein. The terminal may be configured for implementing the method for managing information recommendation according to an embodiment described above.

The terminal 400 may include parts such as a Radio Frequency (RF) circuit 110, a memory 120 including one or more computer-readable storage media, an input unit 130, a display unit 140, a sensor 150, an audio circuit 160, a Wireless Fidelity (WiFi) module 170, a processor 180 including one or more processing cores, a power supply 190, etc. Those skilled in the art may know that the structure of a terminal is not limited to that shown in FIG. 10, but may include more or less parts than those shown in FIG. 10. Some parts may be combined. The parts may be in different deployments.

The RF circuit 110 may be configured for receiving and/or transmitting a signal, for example during communication. The RF circuit 110 may hand received downlink information sent by a base station to one or more processors 180 for processing, and send uplink data to the base station. Usually, the RF circuit 110 may include, but is not limited to, an antenna, at least one amplifier, a tuner, one or more oscillators, a Subscriber Identity Module (SIM) card, a transceiver, a coupler, a Low Noise Amplifier (LNA), a duplexer, etc. In addition, the RF circuit 110 may further communicate wirelessly with a network and other equipment. The wireless communication may adopt any communication standard or protocol, including, but not limited to, Global System of Mobile Communication (GSM), General Packet Radio Service (GPRS), Code Division Multiple Access (CDMA), Wideband Code Division Multiple Access (WCDMA), Long Term Evolution (LTE), electronic mail, Short Messaging Service (SMS), etc.

The memory 120 may be configured for storing software programs and modules. The processor 180 may execute various functions, applications and data processing by executing the software programs and modules stored in the memory 120. The memory 120 may mainly include a program storage area and a data storage area. The program storage area may store an operating system, an application required by at least one function (such as sound playing, image playing), etc. The data storage area may store data (such as audio data, a phone book, etc.) created during use of the terminal 400 and the like. In addition, the memory 120 may include a high speed random access memory, and may also include a long-term memory, such as at least one disk memory, a flash memory or another short-term solid-state memory. Correspondingly, the memory 120 may further include a memory controller for providing access of the memory 120 to the processor 180 and the input unit 130.

The input unit 130 may be configured for receiving input numeric or character information and generating an input of a keyboard, a mouse, an operating lever, an optical or trackball signal related to user settings and functional control. The input unit 130 may include a touch-sensitive surface 131 and other input equipment 132. The touch-sensitive surface 131, also known as a touch display or a touchpad, may collect a touch operation of a user thereon or nearby (such as an operation of the user on or near the touch-sensitive surface 131 using a proper object/accessory such as a finger or a stylus) and drive a corresponding connecting device according to a pre-set program. Optionally, the touch-sensitive surface 131 may include two parts, i.e. a touch detector and a touch controller. The touch detector may detect a touch direction/position of the user, detect a signal generated by the touch operation, and send the signal to the touch controller. The touch controller may receive touch information sent by the touch detector, convert it into touch coordinates, and send the touch coordinates to the processor 180. The touch controller may receive and execute a command sent by the processor 180. The touch-sensitive surface 131 may be implemented as of a resistive, capacitive, infrared, surface-acoustic-wave type, or the like. In addition to the touch-sensitive surface 131, the input unit 130 may further include other input equipment 132, including, but not limited to at least one of a physical keyboard, a function key (such as a volume control key, an on/off key, etc.), a trackball, a mouse, an operating lever, etc.

The display unit 140 may be configured for displaying information input by the user, information provided to the user, various graphic user interfaces of the terminal 4000, etc. Such graphic user interfaces may be formed by graphics, texts, icons, videos and any combination thereof. The display unit 140 may include a display panel 141, which may be optionally configured in form of a Liquid Crystal Display (LCD), an Organic Light-Emitting Diode (OLED), etc. The touch-sensitive surface 131 may cover the display panel 141. The touch-sensitive surface 131 may detect a touch operation on or near the touch-sensitive surface 131 and sent the detected information to the processor 180 to determine a type of a touch event. The processor 180 may provide, on the display panel 141, a visual output corresponding to the type of the touch event. The touch-sensitive surface 131 and the display panel 141 may implement input and output as two independent parts in FIG. 10. The touch-sensitive surface 131 and the display panel 141 may also be integrated to implement the input and output functions in some embodiments.

The terminal 400 may further include at least one sensor 150, such as a light sensor, a motion sensor, etc. The light sensor may include an ambient light sensor and a proximity sensor. The ambient light sensor may regulate luminance of the display panel 141 according to brightness of ambient light. The proximity sensor may turn off the display panel 141 and/or backlight when the terminal 400 moves close to an ear. As a motion sensor, a gravity acceleration sensor may detect a magnitude of acceleration in each direction (usually of the three axes). A gravity acceleration sensor at rest may detect a magnitude and a direction of gravity, and may apply to an application for identifying a posture (such as switching between a horizontal screen and a vertical screen, a related game, calibrating a posture of a magnetometer) of the terminal, vibration identification (such as a pedometer, a tap), etc. The terminal 400 may be configured with another sensor, such as a gyroscope, a barometer, a hygrometer, a thermometer, an infrared sensor, etc., which will not be elaborated herein.

Audio circuit 160, loudspeaker 161 and microphone 162 may provide an audio interface between the user and the terminal 400. The audio circuit 160 may receive audio data, convert the audio data into an electric signal, and send the electric signal to the loudspeaker 161. The loudspeaker 161 may convert the electric signal into a sound signal and output the sound signal. The microphone 162 may collect a sound signal, convert the collected sound signal into an electric signal. The audio circuit 160 may receive and convert the electric signal into audio data, and output the audio data to the processor 180. The processor 180 may process the audio data, and send the audio data to, for example, another terminal through the RF circuit 110, or output the audio data to the memory 120 for further processing. The audio circuit 160 may further include an earphone jack providing communication between an external earphone and the terminal 400.

WiFi is short-range wireless transmission technology. With WiFi module 170, the terminal 400 may help the user send and receive electronic mails, browse web pages, access stream media, etc., providing wireless wideband Internet access to the user. Although shown in FIG. 10, it may be understood that the WiFi module 170 is not a necessary component of the terminal 400 and may be omitted as needed without changing the essential scope of the present disclosure.

The processor 180, as a control center of the terminal 400, may connect each part of the mobile phone using various interfaces and lines, and execute various functions of the terminal 400 and data processing by executing the software programs and/or modules stored in the memory 120 and calling the data stored in the memory 120, thereby monitoring the whole mobile phone. Optionally, the processor 180 may include one or more processing cores. The processor 180 may integrate an application processor and a modem processor. The application processor may mainly process an operating system, a user interface, an application, etc. The modem processor may mainly process wireless communication. It may be understood that the modem processor may be a part that is not integrated in the processor 180.

The terminal 400 may further include the power supply 190 (such as a battery) for supplying power to each part. The power supply may be logically connected to the processor 180 through a power management system, thereby realizing functions such as charging and discharging management, power consumption management, etc. through the power management system. The power supply 190 may further include one or more direct current or alternating current power supplies, rechargeable systems, power failure detection circuits, power converters or inverters, power state indicators, etc.

Although not shown, the terminal 400 may further include a camera, a Bluetooth module, etc., which will not be elaborated herein. The display unit of the terminal 400 may be a touch screen display. The terminal 400 may further include memory and one or more programs stored therein. The one or more programs may be configured to be executed by one or more processors. The one or more programs may include instructions configured for executing an operation as follows:

receiving an instruction to start a communication window corresponding to a target communication account;

sending a server an inquiry for information recommendation including an account identification of the target communication account, such that the server returns a notification to disable recommendation if account information corresponding to the account identification of the target communication account includes a pre-set keyword to disable recommendation; and in response to receiving the notification to disable recommendation returned by the server, disabling, while communication information is being input in the communication window, a pop-up of recommended information corresponding to the input communication information in the communication window.

The method may further include a step as follows:

in response to receiving a notification to perform default recommendation sent by the server, enabling, while the communication information is being input in the communication window, the pop-up of the recommended information corresponding to the input communication information in the communication window, an amount of the recommended information per display being limited by a first pre-set amount; and in response to receiving a notification to enhance recommendation sent by the server, enabling, while the communication information is being input in the communication window, the pop-up of the recommended information corresponding to the input communication information in the communication window, the amount of the recommended information per display being limited by a second pre-set amount, the second pre-set amount being greater than the first pre-set amount.

The method may include: before the sending a server an inquiry for information recommendation including an account identification of the target communication account, determining whether the account information of the target communication account stored locally includes the pre-set keyword to disable recommendation; if the account information stored locally includes the pre-set keyword to disable recommendation, disabling, while the communication information is being input in the communication window, the pop-up of the recommended information corresponding to the input communication information in the communication window, if the account information stored locally includes no pre-set keyword to disable recommendation, sending the server the inquiry for information recommendation including the account identification of the target communication account.

With the embodiment herein, an inquiry for information recommendation sent by a terminal is received; the inquiry for information recommendation may include an account identification of a target communication account; it is determined whether account information corresponding to the account identification of the target communication account includes a pre-set keyword to disable recommendation; if the account information includes the pre-set keyword to disable recommendation, a notification to disable recommendation is sent to the terminal, such that the terminal disables, while communication information is being input in a communication window corresponding to the target communication account, a pop-up of recommended information corresponding to the input communication information in the communication window. Thus, when the account information corresponding to the target communication account includes the pre-set keyword to disable recommendation, the terminal may disable, during communication between a user and the target communication account, the pop-up of the recommended information, such that no information in the communication window will be blocked, thereby improving efficiency in information acquisition.

Those skilled in the art may understand that all or part of the steps of the embodiments may be implemented by hardware, or may be implemented by related hardware executing a program. The program may be stored in a computer-readable storage medium. The computer-readable storage medium may be a read-only memory, a disk, a compact disc, etc.

What described are merely the embodiments herein and are not intended to limit the present disclosure. Any modification, equivalent replacement, improvement, etc. made within the spirit and principle of the present disclosure shall fall within the scope of the present disclosure.

What is claimed is:

1. A method for managing information recommendation, comprising:

receiving, by a server, an inquiry for information recommendation sent by a first terminal authenticated under a first communication account, wherein the inquiry for information recommendation comprises an account identifier of a target communication account;

determining, by the server, whether account information for the target communication account comprises a pre-set keyword to enhance recommendation, wherein the account information corresponds to account identification of the target communication account, wherein the pre-set keyword to enhance recommendation is associated with a threshold quantity of recommendations, the threshold quantity of recommendations being greater than zero; and in response to determination that the account information comprises the pre-set keyword to enhance recommendation, sending, by the server, the first terminal an instruction to prevent in response to communication information being input to the first terminal via a communication window for communication with a second terminal authenticated under the target communication account, the first terminal from displaying more pop-up recommendations corresponding to the input communication information than the threshold quantity of recommendations.

2. The method according to claim 1, further comprising:

in response to the account information not comprising the pre-set keyword to enhance recommendation and a pre-set keyword to disable recommendation, sending, by the server, the first terminal an instruction to display, while the communication information is being input in the communication window corresponding to the target communication account, a default pop-up recommendation, wherein an amount of recommended information per display is limited by a first pre-set amount stored on the first terminal.

3. The method according to claim 1, wherein determining whether the account information comprises the pre-set keyword to enhance recommendation further comprises:

determining whether remarks on the target communication account by the first communication account of the first terminal comprise a pre-set keyword to enhance recommendation;

in response to determination that the remarks on the target communication account by the first communication account of the first terminal comprises the pre-set keyword to enhance recommendation, sending the first terminal the instruction to prevent the first terminal from displaying more pop-up recommendations corresponding to the input communication information than the threshold quantity of recommendations.

4. The method according to claim 3, further comprising:

in response to determination of there being no remarks on the target communication account by the login account of the first terminal to enhance recommendation, determining, by the server among friend accounts of the target communication account, a first number of friend accounts with remarks on the target communication account comprising the pre-set keyword to enhance recommendation; and sending, by the server, in response to the first number of friend accounts being greater than a pre-set threshold, the first terminal the instruction to prevent the first terminal from displaying more pop-up recommendations corresponding to the input communication information than the threshold quantity of recommendations.

5. The method according to claim 4, wherein the in response to determination of there being no remarks on the target communication account by the login account of the first terminal to enhance recommendation, determining, among the friend accounts of the target communication account, the first number of friend accounts with the remarks on the target communication account comprising the pre-set keyword to enhance recommendation comprises:
in response to determination of there being no remarks on the target communication account by the login account of the first terminal to disable recommendation and that the target communication account and the login account of the first terminal belong to no same communication group, determining, among the friend accounts of the target communication account, the first number of friend accounts with the remarks on the target communication account comprising the pre-set keyword to disable recommendation,
wherein the method further comprises:
in response to determination of there being no remark on the target communication account by the login account of the first terminal to disable recommendation and that both the target communication account and the login account of the first terminal belong to a communication group, determining, by the server among accounts belonging to the communication group, a second number of accounts with remarks on the target communication account comprising the pre-set keyword to disable recommendation; and
in response to the second number being greater than the pre-set threshold, sending, by the server, the first terminal the instruction to prevent the first terminal from displaying more pop-up recommendations corresponding to the input communication information than the threshold quantity of recommendations.

6. A server, comprising:
a processor; and
a memory comprising an instructions executable by the processor to:
receive an inquiry for information recommendation sent by a terminal, wherein the inquiry for information recommendation comprises an account identification of a target communication account;
determine account information for the target communication account comprises a pre-set keyword to enhance recommendation, wherein the account information corresponds to an account identification of the target communication account, wherein the pre-set keyword to enhance recommendation is associated with a threshold quantity of recommendations, the threshold quantity of recommendations being greater than zero; and
in response to determination that the account information comprises the pre-set keyword to enhance recommendation, send the terminal an instruction to prevent, in response to detection of communication information being input in a communication window corresponding to the target communication account, the terminal from displaying more pop-up recommendations than the threshold quantity of recommendations, the pop-up recommendations being derived from the input communication information.

7. The server according to claim 6, wherein the memory further comprises instructions executable by the processor to:
determine the account information does not comprise the pre-set keyword to enhance recommendation and a preset keyword to disable recommendation; and
in response to determination that the account information does not comprises the pre-set keyword to enhance recommendation and the pre-set keyword to disable recommendation, send the terminal an instruction to display, in response to the communication information being input in the communication window corresponding to the target communication account, a default pop-up recommendation, wherein an amount of recommended information per display is limited by a second threshold quantity of recommendations, the second threshold quantity of recommendations being stored on the terminal.

8. The server according to claim 6, wherein the memory further comprises instructions executable by the processor to:
determine remarks on the target communication account by a login account of the terminal comprise the pre-set keyword to enhance recommendation; and
in response to determination that the remarks on the target communication account by the login account of the terminal comprises the pre-set keyword to enhance recommendation, send the terminal the instruction to prevent the terminal from displaying more pop-up recommendations than the threshold quantity of recommendations.

9. The server according to claim 6, wherein the memory further comprises instructions executable by the processor to:
determine, among friend accounts of the target communication account, a first number of friend accounts with remarks on the target communication account comprising the pre-set keyword to enhance recommendation; and
in response to the first number of friend accounts being greater than a pre-set threshold, send the terminal the instruction to prevent the terminal from displaying more pop-up recommendations than the threshold quantity of recommendations.

10. The server according to claim 9, wherein the memory further comprises instructions executable by the processor to:
determine the target communication account and the login account of the terminal belong to a communication group;
determine, among accounts belonging to the communication group, a second number of accounts with remarks on the target communication account comprising the pre-set keyword to enable recommendation; and
in response to the second number being greater than the pre-set threshold, send the terminal the instruction to prevent the terminal from displaying more pop-up recommendations than the threshold quantity of recommendation.

11. A server of claim 6 wherein the terminal is configured to limit the quantity of displayed pop-up recommendations to the threshold quantity of recommendations in response to the communication information being input in the communication window and receipt of the instruction to limit the quantity of displayed pop-up recommendations sent by the server.

12. A non-transitory computer readable storage medium comprising:
instructions executable by a processor to cause the processor to:

receive an inquiry for information recommendation sent by a terminal, wherein the inquiry for information recommendation comprises an account identification of a target communication account;

determine account information for the target communication account comprises a pre-set keyword to enhance recommendation, wherein the account information corresponds to an account identification of the target communication account, wherein the pre-set keyword to enhance recommendation is associated with a threshold quantity of recommendations, the threshold quantity of recommendations being greater than zero; and in response to determination that the account information comprises the pre-set keyword to enhance recommendation, send the terminal an instruction to prevent, in response to detection of communication information being input in a communication window corresponding to the target communication account, the terminal from displaying more pop-up recommendations than the threshold quantity of recommendations, the pop-up recommendations being derived from the input communication information.

13. The non-transitory computer readable storage medium of claim 12, the instructions further comprising instructions executable by the processor to cause the processor to:

determine the account information does not comprise the pre-set keyword to enhance recommendation and a preset keyword to disable recommendation; and in response to determination that the account information does not comprises the pre-set keyword to enhance recommendation and the pre-set keyword to disable recommendation, send the terminal an instruction to display, in response to the communication information being input in the communication window corresponding to the target communication account, a default pop-up recommendation, wherein an amount of recommended information per display is limited by a second threshold quantity of recommendations, the second threshold quantity of recommendations being stored on a memory of the terminal.

14. The non-transitory computer readable storage medium of claim 1, the instructions further comprising instructions executable by the processor to cause the processor to:

determine remarks on the target communication account by a login account of the terminal comprise the pre-set keyword to enhance recommendation; and in response to determination that the remarks on the target communication account by the login account of the terminal comprises the pre-set keyword to enhance recommendation, send the terminal the instruction to prevent the terminal from displaying more pop-up recommendations than the threshold quantity of recommendations.

15. The non-transitory computer readable storage medium of claim 14, the instructions further comprising instructions executable by the processor to cause the processor to:

determine, among friend accounts of the target communication account, a first number of friend accounts with remarks on the target communication account comprising the pre-set keyword to enhance recommendation; and in response to the first number of friend accounts being greater than a pre-set threshold, send the terminal the instruction to prevent the terminal from displaying more pop-up recommendations than the threshold quantity of recommendations.

16. The non-transitory computer readable storage medium of claim 15, the instructions further comprising instructions executable by the processor to cause the processor to:

determine the target communication account and the login account of the terminal belong to a communication group;

determine, among accounts belonging to the communication group, a second number of accounts with remarks on the target communication account comprising the pre-set keyword to enable recommendation; and in response to the second number being greater than the pre-set threshold, send the terminal the instruction to prevent the terminal from displaying more pop-up recommendations than the threshold quantity of recommendations.

* * * * *

UNITED STATES PATENT AND TRADEMARK OFFICE
CERTIFICATE OF CORRECTION

PATENT NO. : 10,652,287 B2
APPLICATION NO. : 15/650532
DATED : May 12, 2020
INVENTOR(S) : Wen Zha

Page 1 of 1

It is certified that error appears in the above-identified patent and that said Letters Patent is hereby corrected as shown below:

In the Claims

Column 24, Claim 10, Line 55-56, delete "recommendation" and replace with --recommendations--

Column 26, Claim 14, Line 2, delete "1" and replace with --12--

Signed and Sealed this
Twenty-ninth Day of September, 2020

Andrei Iancu
*Director of the United States Patent and Trademark Office*